| PHASE | OPERATION |
|---|---|
| I | CLEAR FF 34 |
| II | a. SHIFT KEY REG. b. READ DISC |
| III | E1 ON |
| IV | E2 ON |
| V | COMPLEMENT FF34 |
| VI | E1 ON |
| VII | E2 ON |

| FOR CRITERIA SET → | COMPARISON CRITERIA = | ≥ | ≤ | ≠ |
|---|---|---|---|---|
| FF46 | 0 | 1 | 0 | 1 |
| FF47 | 1 | 1 | 0 | 0 |

INVENTORS
RICHARD H. FULLER
JU C. TU
ROBERT M. WORTHY
BY Joseph Dwyer
ATTORNEYS

DATA PROCESSING SYSTEM

INVENTORS
RICHARD H. FULLER
JU C. TU
ROBERT M. WORTHY
BY Joseph Dwyer
ATTORNEYS

INVENTOR.
RICHARD H. FULLER
JU C. TU
ROBERT M. WORTHY
BY Joseph R. Dwyer
ATTORNEYS 3,435,423

DATA PROCESSING SYSTEM

Richard H. Fuller, Sherman Oaks, Ju C. Tu, Sylmar, and Robert M. Worthy, Hollywood, Calif., assignors to General Precision Systems Inc., a corporation of Delaware Filed Sept. 1, 1966, Ser. No. 576,604
Int. Cl. G11b *13/00*
U.S. Cl. 340—172.5 16 Claims

ABSTRACT OF THE DISCLOSURE

A digital data storage and retrieval system using associative memory techniques to simultaneously search in parallel the bit streams serially read from the tracks of a disk memory. The bits are compared, bit by bit, with the bits of a plurality of key registers. During each bit comparison, one bit from each of a plurality of records is compared with a bit of each of a plurality of characters in the key registers, resulting in a multi-record, multi-character, simultaneous search. The determination of the presence of positive comparison between records and the characters in the registers is stored in the records as a flag. After searching the entire memory, the flag records are read out in accordance with the requestor's desired purpose.

This invention relates to a data processing system and more particularly, to improvements therein.

Since the development of computer memories, capable of storing large quantities of data, systems have been designed to retrieve selective data portions on the basis of controlled queries by a requestor or user. Some systems have been proposed, whereby stored data, hereafter also referred to as records, can be retrieved by processing the content of the records in relation to a queried record content. In other systems, data or records are retrieved by searching for stored characters, characteristic of the records, which yield references to locations in the memory of records containing certain character combinations which form the basis of the user's query. The present invention is primarily directed to the latter-described type system. That is, to a data or record retrieval system in which record locations are detected on the basis of a comparison between stored record characters and query-forming characters forming a requestors' query. As the number of records to be stored becomes very large and the total number of possible characters, which are associated with to describe any one record, quite substantial, the cost, complexity and retrieval time of prior art systems generally increases since each character of each record must be compared with each of the query-forming characters before the location of each record, containing all the query characters is determined.

It is therefore an object of the present invention to provide a new data retrieval system.

Another object is to provide a record retrieval system, characterized by fast search and retrieval time.

A further object is to provide a new relatively simple record storage and retrieval system, capable of storing a large number of records, the location of each being retrievable as a function of characters assumed to describe it and associated therewith.

Still another object is to provide a record storage and retrieval system which is relatively less expensive and faster to operate than prior art arrangements, designed to perform comparable operations.

Still a further object is the provision of a system in which a plurality of records are simultaneously compared with a plurality of different query parameters in different comparison criteria so as to reduce the time required to retrieve the location of any record meeting the multicriteria comparisons.

These and other objects of the invention are achieved by providing a memory in which records are stored on a plurality of memory tracks, such as on a disc memory system, in conjunction with which the invention will be described. The storing of one or more records on each track is accomplished by means of a write magnetic head associated with the track, which serially stores bits comprising the characters of each record in the track. Read heads are associated with the tracks, to serially read out the bits stored in the tracks. An associative memory system is employed to simultaneously search in parallel in a search mode, the bit streams emanating from each of the disc's read heads against bits of a set of characters in a plurality of key registers in any one or a combination of search criteria. The bits in each stream or from each track are compared serially, bit by bit, with the bits of each of the characters in the key registers. Thus, during each bit comparison interval, one bit from each of a plurality of records, each stored on a different memory track, is compared with a bit of each of a plurality of characters, resulting in a multirecord, multiquery character simultaneous search.

At the end of the comparison of a fixed number of bits, defining a character, the presence of a comparison between the character, serially read out from each track, with one or more of the characters in the registers is determined and stored as a binary digit in the associative memory system. At the end of each readout record, the characters thereof which may have compared with a selected combination of the query characters is determined. When a positive comparison indication is produced, a preselected signal, hereafter referred to as a flag, is stored at the end of the particular record. Then, after the searching of the entire memory, the flag-containing records are read out and operated upon in accordance with the requestor's desired purpose in locating the stored records which contain the particular selected combination of the query characters.

The novel features that are considered characteristic of this invention are set forth with particularity in the appended claims. The invention will best be understood from the following description when read in connection with the accompanying drawings, in which:

Figures 1, 7, 8:
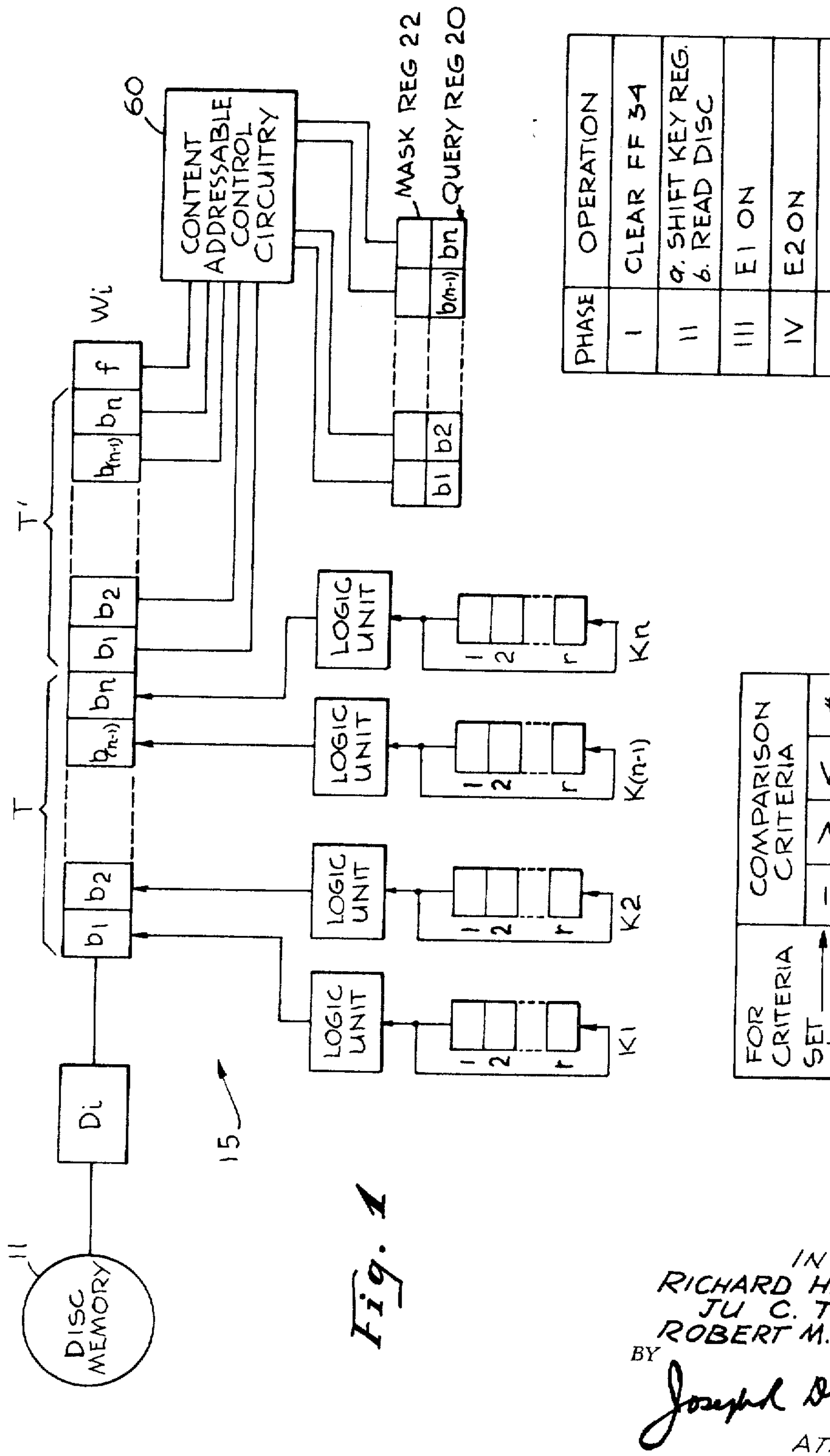
FIGURE 1 is a simplified block diagram of the data processing system of the present invention useful to explain the general principle of operation thereof.
FIGURES 7 and 8 are charts defining the various phases of operation of the logic circuitry shown in FIGURE 6.

Attention is now directed to FIGURE 1 which is a simplified diagram, useful in explaining the mode of operation of the present invention. Therein, reference numeral 11 designates a disc type memory, hereafter simply referred to as the disc, comprising a plurality of disc tracks on which records are assumed to be stored. The records are made up of fixed length characters. The characters in each record are assumed to describe its content and therefore are also referred to as descriptors. In accordance with the teachings of the present invention, it is these descriptors which are used to search and locate the address of the record. The number of descriptors may vary from record to record. However each record terminates with an identical end-of-record character.

The disc memory 11 is shown coupled to an associative search processor 15 which receives the parallel bit streams from the disc tracks and performs a multirecord multi-character simultaneous search. The associative system 15 includes a logic stage $D_i$ for each track of the disc. The bit streams from the disc are read into the D logic stages in parallel, one bit at a time. Assuming that each of the various records stored in disc 11 may be described by any combination of up to $n-1$ characters plus, the end-of-record character for a total of $n$ characters, the associative system 15 includes $n$ key registers, designated in FIGURE 1 by K1 through through K$n$. The key registers K1 through $K(n-1)$ which are end-around shift registers, are used to hold the $n$ characters or descriptors any combination of which may comprise the user's query character combination, while register K$n$ contains the end-of-record character. One key register is used for every other character. The bit length of each key register is identical with the bit length of a character in the disc 11.

Allied with each logic stage $D_i$ is an associative memory word $W_i$, $W_i$ is composed of two tag fields, designated T and T'. In addition, the word includes a one bit flag field, designated by the letter $f$. Each of the tag fields consists of $n$ bits, so that the total bit length of word $W_i$ is equal to $2n+1$. Bits from the key registers are compared, bit by bit, with the bits in the $D_i$ logic stages and the results of the comparisons are stored in the bits of field T. These comparisons all take place simultaneously, for any number of records and any number of keys. The number of records equals the number of tracks of disc 11, and the number of keys being related to the number of key registers.

At the end of the comparison of a complete character the content or binary state of bit $T_i$ indicates the state of comparison between the character in key register $K_i$ and the particular character read out from the track associated with word $W_i$. At the end of the comparison of each character, the state of bit $T_i$ is transferred to bit $T'_i$, associated with bit $T_i$ where the state of the search is carried over from character to character. After the state transfer, the T bit is set to a selected state in order to subsequently respond to the comparison of the character in register $K_i$ with a subsequently supplied character from the logic stage $D_i$.

The state of field $T'_i$ is interrogated by comparing it with the binary states of bits in a multibit query register 20 which stores the particular query character combination sought by the requestor. Register 20 which may be coupled to the $T'_i$ field through a mask register 22, the function of which will be explained in the following description, is coupled, together with the $T'_i$ field to a content addressable control circuitry 60. Briefly, the function of circuitry 60 is to compare the content of register 20 or any part thereof with the $T'_i$ field or a corresponding portion thereof of each of the memory words and provide an output when the $T'_i$ field of any memory word matches the content of the query register.

At the end of a record, detected by the positive comparison of the end-of-record character circulating in key register K$n$ and an end-of-record character supplied to logic stage $D_i$, bit $n$ in tag field $T_i$ is set to a predetermined state. This state is transferred to the $n$ bit in field $T'_i$ which is interrogated to ascertain whether the query, i.e. the particular combination of characters, in register 20 was present in the particular record. If it was, bit $f$ in word $W_i$ is set to a particular state, such as a binary "1," which causes the storing of a preselected flag signal or symbol at the end of the searched record. Also, the entire $T'_i$ field of the particular word is reset to "0" to accumulate the character by character comparison of a subsequent readout record. If however the particular combination of characters in the register 20 was not found in the field $T'_i$, i.e. field $T'_i$ did not match the state of register 20, the $f$ bit remains in the "0" state and the $T'_i$ field is reset. It should be pointed out that after every transfer of the states of the $T_i$ field bits to the $T'_i$ field, the latter field is interrogated. However, only when an end-of-record character is detected, that is, the $n$ bit in field $T'_i$ is in a particular state, is the $T'_i$ field reset and the state of the $f$ bit switched to a "1" state or left in a "0" state, depending on the presence or absence of the particular character combination in the searched record.

Figure 2:
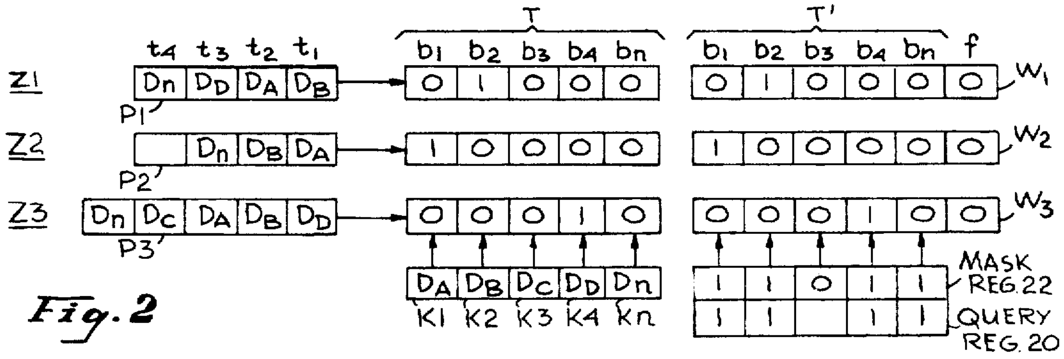
FIGURES 2 through 5 are diagrams useful in explaining the multi-character multi-criteria comparison performance of the present invention in conjunction with a specific example.

For a better explanation of the novel system of the present invention, reference is made to FIGURE 2. Let it be assumed, that any one of the records in disc 11 is definable by one or more of descriptive characters $D_A$, $D_B$, $D_C$, and $D_D$, with the end-of-record character being designated by a character $D_n$. Therefore, in accordance with the teachings of the invention, key registers K1 through K4 store characters $D_A$ through $D_D$ respectively, with the character $D_n$ being stored in key register K$n$. Let it further be assumed that the disc 11 comprises of three disc tracks Z1, Z2 and Z3 from which records designated P1, P2, and P3 respectively may be read out in parallel, character by character, though in practice each character is read out as a sequence of bits. In FIGURE 2, records P1 and P2 are shown comprising of three and two descriptive characters respectively, while record P3 is shown including all four of the descriptors $D_A$ through $D_D$. Since the number of tracks is equal to three and the maximum number of characters is four, plus the end-of-record character $D_n$, for a total of five, the associative memory includes three memory words designated W1, W2, and W3, each comprising of $2\times5+1$ bits, i.e. 11 bits. In each word, each of the tag fields T and T' consists of five bits, while an additional bit designated the $f$ bit is included in each word.

In accordance with the teachings of the present invention, in one arrangement, prior to a search operation, the T bits of all the memory words are set to a binary "1" state while all T' bits, as well as the $f$ bits are set to a binary "0." Then, during each character comparison interval, the character supplied from each track, is compared with the characters in all the key registers. If a comparison is detected, the particular T bit associated with the particular key register remains in a binary "1" state, while all the other T bits are set to a "0" state. At the end of a character comparison interval, the states of the bits in the T field are 0 Red with the states of the bits in the T' tag field in accordance with the following logical equation:

$$T_i+T_i'=T_i'$$

That is, if the T bit or the T' bit is a binary "1," the T' bit is set to a binary "1" state. Only when the bits in both fields are binary "0's" does the bit in field T' remain a binary "0."

Let us assume that prior to a time $t_1$, all the T bits are in a binary "1" state and those in the field T' are in a binary "0" state. Let it further be assumed that during a character comparison interval $t_1$, characters $D_B$, $D_A$, and $D_D$ of records P1, P2, and P3, respectively, are simultaneously supplied and compared with the characters in the various key registers. Then, at the end of the time interval $t_1$, it is appreciated that since $D_B$ of word P1 matches the $D_B$ in key register K2, bit $b2$ in field T, also referred to as $T_{b2}$ of word W1 remains in a binary "1" state. Similarly, due to the comparison of $D_A$ of P2 with $D_A$ in key register K1, bit $b1$ in tag field T or $T_{b1}$ of word W2 remains in a binary "1" state. Also, similarly $T_{b4}$ in word W3 remains in a binary "1" state because of the positive comparison between $D_D$ of P3 which matches $D_D$ in key register K4. All the other bits in the tag field T are set to a binary "0" state, because of the lack of comparison between the two characters compared in relation thereto.

The states of the various bits in the tag field T are then transferred to the bits in the tag field T'. Thus, in accordance with the aforementioned logical equation, $T'_{b2}$, $T'_{b1}$ and $T'_{b4}$, of words W1, W2, and W3, respectively, are set to a binary "1" state, while all the other bits in field T' remain in a binary "0" state.

For the example diagrammed in FIGURE 2 let it be assumed that the desired search criteria is to detect and flag records which contain descriptive characters $D_A$, $D_B$ and $D_D$, while the presence or absence of $D_C$ is not material. This search criteria is set into query register 20 and mask register 22. In register 22 the bits corresponding to bits *b*1, *b*2, *b*4 and *bn* in T′ are set to a binary "1" while the bit corresponding to *b*3 is set to a "0" state to indicate that the presence or absence of descriptive character $D_C$ is not controlling. In query register 20 the bits corresponding to $T'_{b1}$, $T'_{b2}$, $T'_{b4}$ and $T'_{bn}$ are in a "1" state while the bit corresponding to $T'_{b3}$ may be in either state, represented by the absence of either a "0" or a "1."

After the transfer of the states of the T bits to the T′ bits, the content of query register 20 is compared through register 22 with the T′ fields of all the words W1, W2 and W3 in a manner similar to that performed in prior art associative or content addressable memories. As long as the $T'_{bn}$ bit of any of the words is not in a "1" state, indicating that the end of any of the records P1, P2 and P3 has not been reached, the T′ fields of all the words remain unaltered and the system is switched to compare the subsequently supplied descriptive characters of the three records, shown in FIGURE 3 to which reference is made herein.

Figure 3:
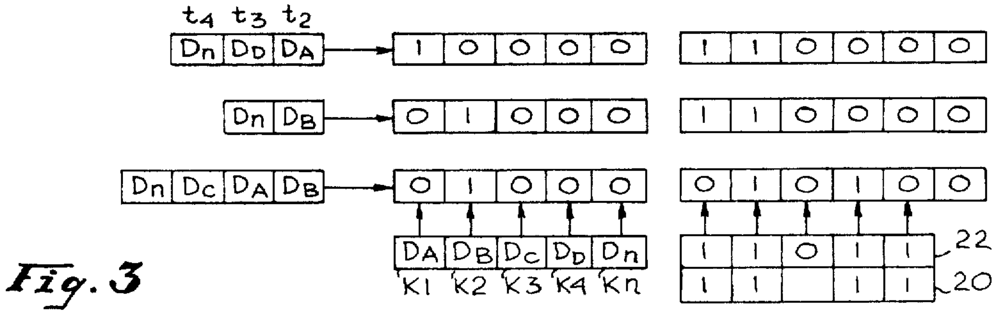

It should be pointed out that prior to comparing $D_A$, $D_B$ and $D_D$ of records P1, P2 and P3 respectively, the states of T′ fields of W1, W2, and W3 are as shown in FIGURE 3 while all the bits in the T fields of the three words are reset to a binary "1" state. Then during $t_2$, the descriptive characters $D_A$, $D_B$ and $D_D$ are compared with the characters in key register K1 through K*n*. Because of the comparison at the end of $t_2$ bit $T_{b1}$, $T_{b2}$ and $T_{b2}$ of W1, W2 and W3 respectively remain in a "1" state, and all other T bits reset to "0." The states of the T bits are then 0 Red with the states of the T′ bits, so that after the state transfer, bits $T'_{b1}$, $T'_{b2}$ and $T'_{b2}$ of W1, W2 and W3 are set to a "1" state, while $T'_{b2}$, $T'_{b1}$ and $T'_{b4}$ of W1, W2 and W3 remain in a "1" state to which they were set during interval $t_1$ (FIGURE 2). All the other T′ bits remain in the "0" state in which they were initially set.

Then the T bits are set to the "1" state for a subsequent character comparison and the T′ bits interrogated by being compared with the content of the query register 20. However, since at the end of $t_2$ none of the $T'_{bn}$ bits is in a "1" state, thereby indicating that the end of any of the three records has not been reached, the T′ fields remain unaltered and the search operation continues.

Figure 4:
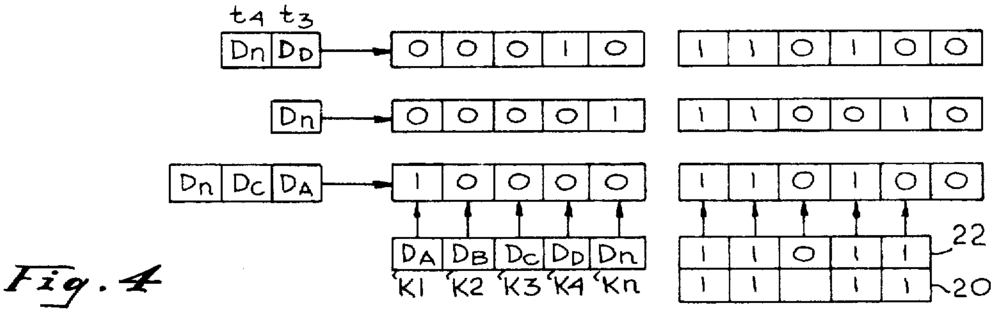

The search operation during $t_3$ is diagrammed in FIGURE 4. During $t_3$ $D_D$, $D_n$ and $D_A$ of P1, P2 and P3 respectively are compared with the characters in the key registers. It should be pointed out that $D_n$ in P2 represents the end of record P2. As a result of the comparison, $T_{b4}$, $T_{bn}$ and $T_{b1}$ of W1, W2 and W3 respectively remain in the "1" state and all other bits are set to "0." Then, the states of the T bits are again ORed with the T′ bits to produce the states diagrammed in FIGURE 4. The T bits are reset to a "1" state.

Figure 5:
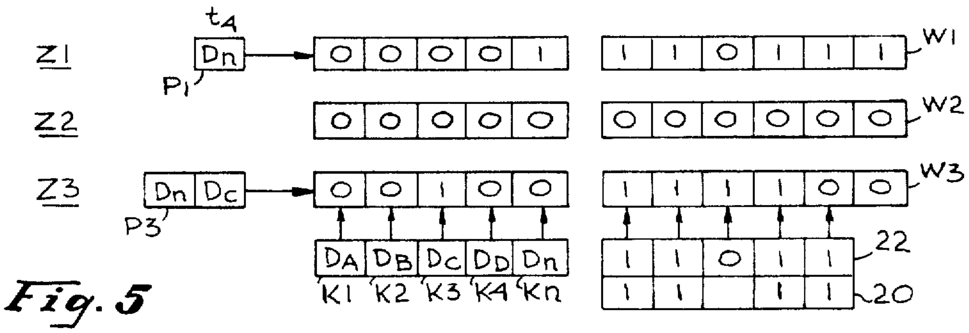

Thereafter the T′ field is interrogated. Since the $T'_{bn}$ bit of W2 is a "1" indicating that the end of the record on track Z2 has been detected, the content of the T′ field of W2 is compared with that of query register 20. However, since $T'_{b4}$ of W2 is a "0" indicating that the record P2 did not contain descriptive character $D_D$, the *f* bit of W2 remains in the "0" state and the entire T′ field of W2 reset to "0," preparing word W2 to store the comparisons of a subsequently supplied record on the track Z2 associated with word W2. The resetting of the T′ field of W2 to "0" is shown in FIGURE 5. The T′ fields of W1 and W3 remain however unaltered since the end-of-record characters associated with records P1 and P3 have not as yet been detected.

During a subsequent character comparison interval $t_4$, diagrammed in FIGURE 5, the end of record character $D_n$ of P1 and $D_C$ of P3 are compared with the characters in K1 through K4 and K*n*. No signal is assumed to be supplied to W2 from track Z2. As a result at the end of $t_4$, only $T_{bn}$ of W1 and $T_{b3}$ of W3 remain in a "1" state and all other T bits set to "0." Upon transferring the "1" states of $T_{bn}$ of W1 and $T_{b3}$ of W3 to their respective bits in the T′ field, the states of the bits therein are as diagrammed in FIGURE 5. All the bits in the T′ field of W2 are shown in the "0" state. The T′ field is then interrogated. Since $T'_{bn}$ of W1 is in a "1" state, indicating the end of record of P1 and since bits $T'_{b1}$, $T'_{b2}$ and $T'_{b4}$ of W1 correspond to the bits in register 20, a "1" is stored in the *f* bit of W1, indicating that record P1 matches the comparison criteria i.e. it contains descriptive characters $D_A$, $D_B$ and $D_D$. The setting of the *f* bit of W1 in the "1" state may be used to actuate a write head to write a flag symbol into record P1 so that during a subsequent record retrieval cycle all records with flag symbols may be retrieved.

It should be pointed out that in the T′ field of W3 bits $T'_{b1}$, $T'_{b2}$ and $T'_{b4}$ are also in the "1" state matching the search criteria. However a "1" is not stored in the *f* bit of W3, since the $T'_{bn}$ bit thereof is in a "0" state, indicating that the searching of the record has not been completed. Only during a subsequent time interval when $D_n$ of P3 is compared is the end of record of P3 detected, which will result in the setting of the *f* bit of W3 and the subsequent storing of a flag symbol in the P3 record to indicate that it too met the comparison criteria. It should be pointed out the P3 meets the search criteria even though it contains the descriptive character $D_C$, since the 0 in the bit *b*3 of mask register 22 indicates that the content of $T'_{b3}$ is insignificant. However, had the search criteria been to tag records containing $D_A \cdot D_B \cdot D_D$ and not $D_C$ represented as $D_A \cdot D_B \cdot \overline{D}_C \cdot D_D$, where the · represents the AND function and the bar (—) the complement, a "0" and a "1" would have been stored in *b*3 of registers 20 and 22 respectively. Consequently, the mismatch between the states of *b*3 of register 20 and $T'_{b3}$ of W3 would have indicated that P3 does not contain the search criteria and therefore a flag symbol would not have been stored therein.

Herebefore in the description of FIGURES 2–5, it has been assumed that a complete character or descriptor from each track is compared with a complete character in each of registers K1–K4 and K*n*. However, in practice each character consists of a plurality of bits serially read out from memory 11. The comparison is made on a bit by bit basis rather than on a character by character basis. Thus, the previously referred to character comparison interval actually comprises *y* bit comparison intervals, where *y* is the fixed number of bits per character.

Prior to comparing the characters read out from memory with the characters in the registers on a bit by bit basis, the entire T field of all words is set to a "1" state. Then during each bit comparison interval, one bit from each track is compared with one bit of each of the characters in the registers, controlling the states of the respective T field bits. However, only at the end of *y* bit comparison intervals, i.e. at the end of the comparison of a complete character, is the state of each T bit ORed with that of its corresponding T′ bit as herebefore described. Logic circuitry associated with the various registers is employed so that at the end of each character comparison, the state of each T bit indicates the comparison between the two characters related thereto, i.e. the characters from the track and register associated therewith. For example in FIGURE 2, $D_A$ of P2 and $D_A$ in K1 are multibit characters, with their bits being serially compared. The state "1" of $T_{b1}$ at the end of $t_1$ represents the comparison of the completed multibit character, rather than of any single bits thereof.

Figure 6:
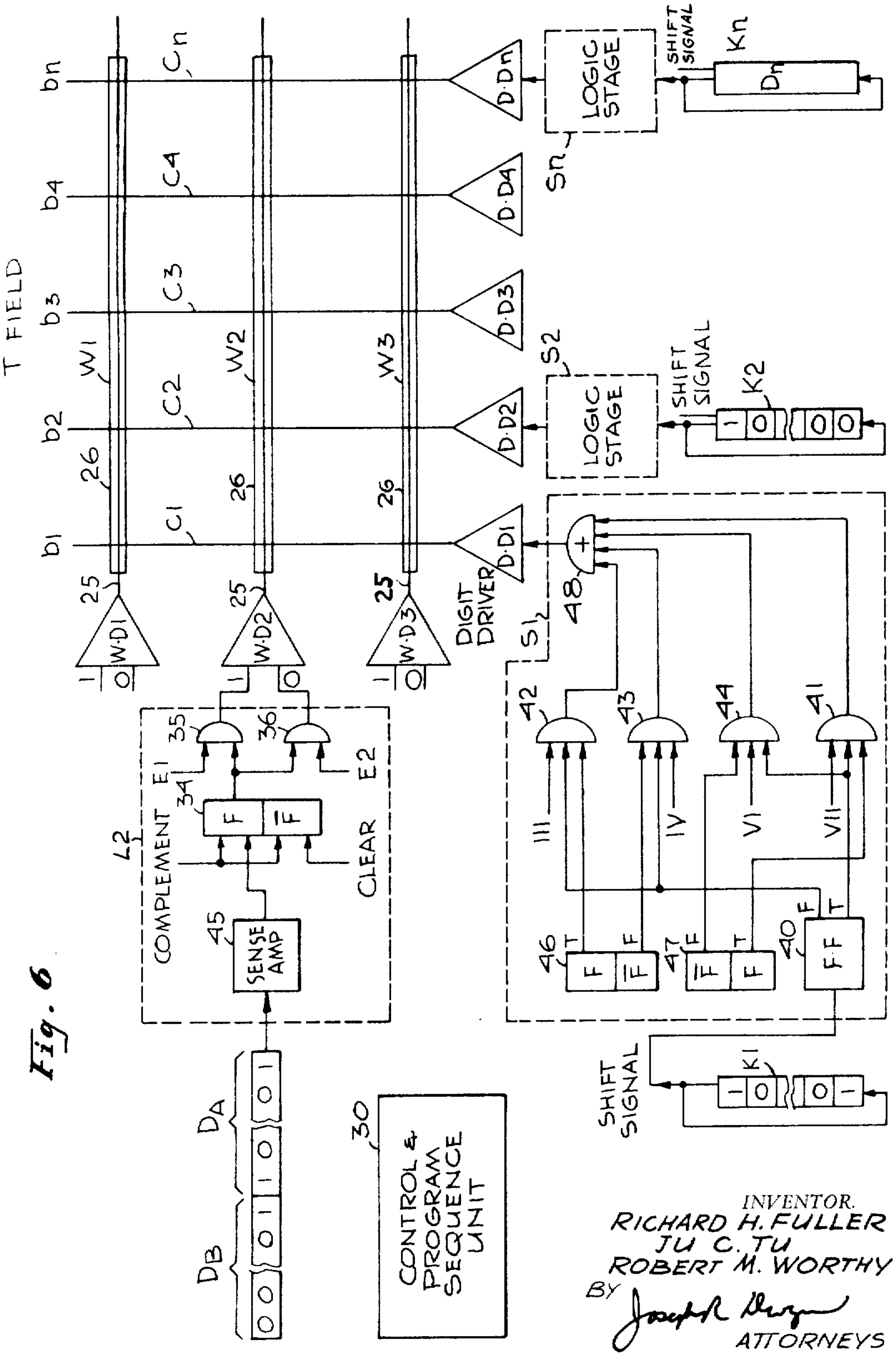
FIGURE 6 is a detailed block diagram of the logic circuitry necessary to perform the multi-character, multi-criteria comparison operation.

Reference is now made to FIGURE 6 which is a block and schematic diagram of one embodiment of circuitry necessary to control the state of the T bits as a function of the comparisons between the bits supplied from memory 11 in parallel and bits of characters in the key registers. In FIGURE 6, the T field portions of words W1, W2 and W3 are assumed to comprise of plated magnetic wires of the type, capable of storing binary states as a function of the directions of circumferential flux at different points along its plated magnetic surface. Such wires and their capability of storing binary signals have been described in the prior art.

Briefly each of the storage words (W1, etc.) may be assumed to consist of a nonmagnetic wire 25, such as copper, on which is plated a thin magnetic film 26. During the plating operation, a current is caused to flow in wire 25 in order to create a circumferential easy axis of magnetization in film 26. A plurality of digit lines intersect each of the plated wires with the points of intersection of the plated wire with the digit lines representing bit locations or bits. In FIGURE 6, for example, the intersection of digit lines C1 through C4 and C*n* with W1 represent bits $T_{b1}$ through $T_{b4}$ and $T_{bn}$ of W1. Each bit is controlled to store a binary signal as a function of the direction of circumferential flux thereat. The circumferential flux direction is controlled as a function of the coincidence of currents in the digit line from its respective digit driver designated $D{\cdot}D{\cdot}1$ through $D{\cdot}D{\cdot}n$ and polarities of current in wire 25 from a word driver to which wire 25 is connected. The current from the digit driver is unipolar, while that from the word driver is bipolar.

The word driver is shown having a 1 input and a 0 input. When the 1 input is true, the word driver provides a current of a first polarity, while a current of a second opposite polarity is provided when the 0 input is true. A "1" is stored in any of the bits such as $T_{b1}$ of W1 when current flows in C1 and the current in 25 is of the first polarity, while a "0" is stored when, in coincidence with the current in C1, the current in 25 is of the second polarity. To set all the bits in the T field to a "1" state, as is required before the start of the comparison of a character, all that is needed is to actuate the digit drivers and set the 1 inputs of all word drivers to be true.

In accordance with the teachings of the invention, the output of each track such as Z2 is connected to the word driver $W{\cdot}D{\cdot}2$ connected to its respective storage word $W{\cdot}2$ through a logic stage L2. Each key register is connected through a logic stage S to the digit driver coupled to the bits associated with the particular register. Thus S1 represents the logic stage connecting register K1 to the digit driver $D{\cdot}D{\cdot}1$ coupled to the $T_{b1}$ bits of the various storage words. The logic stages L and S are also connected to a control and program sequence unit 30 which supplies various circuits of L and S with controlling signals during a multiphase programmed sequence.

The multiphase sequence of operation is diagrammed in chart form in FIGURE 7 to which reference is made herein. At the beginning of each bit comparision interval, during phase I, unit 30 clears a flip-flop 34 in logic stage L2, so that its output, connected to one input of each of AND gates 35 and 36, is false. Hereafter, false and true states are assumed to be represented by "0" and "1" binary signals respectively. Then, during phase II key register K1 is shifted by a shift signal from unit 30, advancing the contents of the bits therein by one bit and storing a new bit in a flip-flop 40 in logic stage S1. $F{\cdot}F{\cdot}40$ has true. (T) and false, (F) outputs connected to one input of AND gates 41 and 42 respectively. Thus, when a "1" is in the output bit of register K1, i.e. at the input of $F{\cdot}F{\cdot}40$, as shown in FIGURE 6, the T output is true, while the F output is true when $F{\cdot}F{\cdot}40$ is supplied with a "0" from the output bit of K1.

In FIGURE 6, $F{\cdot}F{\cdot}34$ is shown connected to the output of the memory track Z2, with which it is associated, through a sense amplifier 45, the function of which is to set flip-flop 34 to a "1" when the track output is a "1" and to a "0" when the track output is a "0." The setting of $F{\cdot}F{\cdot}34$ as a function of the track output is accomplished during phase II. Logic unit S1 includes flip-flops (FF) 46 and 47. The true (T) and false (F) output of FF46 are connected to one input of AND gate 42 and an AND gate 43 respectively, while the T and F outputs of FF47 are connected, respectively, to one input of gate 41 and an AND gate 44. For a comparison criteria of equality, that is, when the bits from the track and the key register K1 are compared to see whether they are the same, FF's 46 and 47 are set to a store a "0" and a "1" respectively, so that the F output of 46 and the T output of 47 are true. Each of gates 41–44 has one input which is set to true during one of phases VII, III, IV and VI respectively. The outputs of gates 41–44 are connected to the inputs of an OR gate 48, the output of which is connected to actuate digit driver $D{\cdot}D{\cdot}1$ when one of the gate's inputs is true.

As seen from the chart of FIGURE 7 and FIGURE 6, during each of phases III and VI, a true E1 signal is supplied to another input of AND gate 35 so that if both of its inputs are true, AND gate 35 is enabled, setting the 1 input of the word driver $W{\cdot}D2$ to provide a current in wire 25 to write a "1" in any of the bits of word W2, if the digit line of the bit carries current coincidently. Similarly, during phases IV and VII, a true E2 signal is supplied to one input of AND gate 36, while during phase V FF 34 is complemented by a complement signal from unit 30.

From the foregoing, it should be appreciated that with FF's 46 and 47 in a "0" and "1" state to which they are set for an equality comparison criteria, during none of the phases is coincident current present in wire 25 and the digit line C1, as long as the two compared bits from the track Z2 and the key register K1 are the same. Consequently, the state of each $T_{b1}$ bit remains in the binary "1" state. Thus at the end of the comparison of a multibit character, the state of each $T_{b1}$ bit remains in the "1" state to be transferred to its corresponding T′ bit. If however a mismatch exists, current is present in the digit driver when the "0" input of the word driver is true, so that the corresponding $T_{b1}$ bit is set to a binary "0." For example, assuming the bit from track Z2 is a "1" and that from register K1 is a "0," then during phase IV, and "0" input of the word driver $W{\cdot}D{\cdot}2$ is true, while at the same time gate 43 is enabled, actuating the digit driver $D{\cdot}D{\cdot}1$ through gate 48. Consequently a "0" is stored in $T_{b1}$ of W2. The T bit will remain in the "0" state even if subsequent bits match one another. Similarly, if the bit read out from track Z2 is a "0" and the bit from K1 is a "1" coincident current, for setting bit $T_{b1}$ of W2 in a "0" state, will occur during phase VII.

In the example shown in FIGURE 6, record P2 (FIGURE 2) is assumed to be read out character by character and bit by bit from track Z2. The first two characters $D_A$ and $D_B$ are shown comprising bit 10 . . . 01 and 00 . . . 01 respectively, reading from right to left. Character $D_A$ is shown in register K1. From the foregoing, it should be appreciated that after comparing the character $D_A$, bit by bit, bit $T_{b1}$ will remain in a "1" state. However, when comparing the last bit of character $D_B$ read out from track Z2 which is a "0," with the last bit of $D_A$ in register K1 a mismatch is sensed, causing bit $T_{b1}$ to be set to a "0" state.

The logic circuitry shown in FIGURE 6 is not limited to controlling the setting of the T bits only when comparing characters on a bit by bit basis for equality. By controlling the settings of FF's 46 and 47 in each S logic stage, each multibit character read out from memory can be compared with the multibit character in each key register on the basis of different comparison criteria. When the characters comprise multibit numbers, with both FF's 46 and 47 set to binary "1's," the T bit associated with the particular L and S logic stages remains in a binary "1" state, as long as, the character or number from memory is equal to or greater than the character or number in the key register, with the comparison being performed on a bit by bit basis starting with the least significant bit. On the other hand, by setting FF's 46 and 47 to binary "0" states, the T bit remains in a binary "1" state as long as the number from memory is equal to or smaller than the number in the corresponding key register. With FF's 46 and 47 set to a binary "1" and "0" states respectively, the T bit remains in a binary "1" state, irrespective of the comparison between the two compared multibit numbers. FIGURE 8 is a simple chart representing the binary settings of FF's 46 and 47 for the various comparison criteria between the character or number read out from memory and the one in the key register. In FIGURE 8, the symbol # represents an insignificant comparison criteria, whereby the T bit remains in a "1" state irrespective of the numerical relationship between the two compared multibit numbers.

From the foregoing description, it should thus be appreciated that, since each character is simultaneously compared with the character in each of the key registers, bit by bit, and since FF's 46 and 47 in each S logic stage can be set for a different comparison criteria, a single character from memory may be compared, simultaneously, with different characters in different comparison criteria or search modes. Furthermore, a plurality of characters from memory can be compared in parallel with the characters in the registers in the different comparison criteria, a capability most significant in reducing the time required to compare the content of a multicharacter memory with a plurality of characters in different comparison criteria such as equality, equal to or greater than, equal to or smaller than, etc.

The novel system of the invention may be summarized as a system consisting of a plurality of multibit memory words the bits of each word divided into T and T′ fields each word is associated with a different track of a memory from which characters are sequentially read out bit by bit, while each bit in the word is associated with the character content of a different register. Logic circuitry couples each track to each word and each register to its related bits in the different memory words. The logic circuitry can be set so that a character in each register may be compared in any one of a plurality of comparison criteria with each of the characters read out from memory.

At the end of each character comparison interval, the results of the comparison of each character from memory with all the register characters is stored in the form of the states of the T bits of the particular memory words. These states are transferred to the T′ bits of the memory word where the comparison is accumulated from each character comparison interval to the next.

When a complete record consisting of a plurality of characters is read out, the states of the T′ bits is compared with states in a query register to determine whether the record contains a particular combination of characters forming a search criteria. If it does, a flag is stored in a selected location in the memory containing the record. At the end of searching all the records in memory the records containing flags, i.e. those containing the particular combination of characters, are retrieved.

From the foregoing description, it should be appreciated that, the T field of each of the words such as W2 is used to indicate, at the end of each character comparison interval, the results of the comparison between a character readout from memory and each of the characters in the plurality of key registers, while the related T′ field of the word is used to accumulate the results of the comparison from each character comparison interval to the next. Only when the end-of-record character D*n* is sensed, thereby indicating that a complete record has been read out from memory, is the content of the T′ field compared with the content of the query register 20, to determine whether the particular readout record contained the particular combination of characters or descriptors, forming the requestor's query.

The comparison of the content of query register 20 with each of the T′ fields of the plurality of words is performed in a manner similar to that performed in an associative or content addressable memory system, in which a plurality of stored words in memory are compared in parallel with a single address word. Generally in such a system each of the words in memory matching the particular address word is identified by providing an output signal. Contents addressable memory readout techniques and circuits are well known in the art and therefore, a detailed description thereof is deemed unnecessary. However for explanatory purposes, the block designated in FIGURE 1 by reference numeral 60 is representative of the content addressable control circuitry necessary to compare the content of the T′ field of each word with the content of the query register 20 through the mask register 22.

Similarly, presently known signal transfer techniques may be employed to transfer the content of the T bits to their respective T′ bits. For example, when employing a plated wire memory, the T bits of word W2 may be transferred to the T′ bits of the same word by unit 30 (FIGURE 6) providing a plurality of control signals during a multiphase sequence, during which the state of each T bit of word W2 is sequentially read out and stored in its corresponding T′ bit. For example, bit $T_{b1}$ of W2 may be transferred by enabling digit driver DD1 to apply a current in line C1 so that the state of bit $T_{b1}$ of W2 is sensed in word line 25 which is transferred to sense amplifier 45. Depending whether $T_{b1}$ is a "1" or a "0," flip flop 34 is either true or false. Then, a signal E1 is supplied to AND gate 34, so that either the "1" input or the "0" input of word driver WD2 is enabled, inducing either a "1" current of a "0" current in word line 25. This current in coincidence with a current from a digit driver (not shown) may cause the storing of a "1" or a "0" in bit $T'_{b1}$ of word W2. Since column line C1 couples the bit $T_{b1}$ of all the words, W1, W2 and W3, all the *b*1 bits may be simultaneously read out and transferred to their corresponding bits in the T′ field. Then, the bits $T_{b2}$, $T_{b3}$, etc., may be sequentially read out from the T field and transferred to their corresponding bits in the T′ field.

It should be appreciated that the foregoing description of transferring the content of the T field to the T′ field is but one example, particularly applicable when used in conjunction with a plated wire memory type arrangement. However as is appreciated by those familiar with the art the storage words may comprise of other types of storage elements so that appropriate signal transfer techniques may be employed therefore.

There has accordingly been shown and described herein, a novel data processing system whereby, a plurality of records simultaneously read out on a plurality of tracks of a memory in which the records are stored are simultaneously compared with each of a plurality of characters in any one of a plurality of comparison criteria to determine which of the records contained a predetermined combination of characters, representing a requester's query. When the characters comprising each record consist of multibit numbers, each of the numbers may be compared with any one of a plurality of multibit numbers in the key register. The comparison of the read out number with each of the numbers in the key registers may be in accordance with a different comparison criteria, such as equality, equal or greater than, equal or smaller than, etc., thereby minimizing the time required for searching the content of the various records and tagging selected ones thereof.

It is appreciated, that those familiar with the art, may make modifications and/or substitute equivalents in the arrangements as shown without departing from the true spirit of the invention. Therefore all such modifications and/or equivalents are deemed to fall within the scope of the invention as claimed in the appended claims.

What is claimed is:

1. In combination with a memory in which is stored at least one multibit character, sequentially readout therefrom, bit by bit, a system for comparing said character with each of $n$ characters and for providing indications of the comparisons therebetween, the system comprising:

$n$ storage elements each having two binary states;

$n$ end-around shift registers each containing one of $n$ characters with which the character readout from memory is compared; and means coupling said storage elements to said shift registers and to said memory from which said character is sequentially readout, said means including logic means responsive to each bit of the character read out from said memory and each corresponding bit of the character contained in each register for controlling the states of said $n$ storage elements whereby at the end of the comparison of the character readout from memory, the binary state of each storage element is indicative of the comparison between said character readout from memory and a character in a register associated therewith.

2. The system defined in claim 1 wherein said memory includes a plurality of multibit characters, readout in parallel therefrom each character being sequentially readout bit by bit, said system, including a plurality of groups of $n$ storage elements, a corresponding element in each group being associated with another of the shift registers, and each group of $n$ storage elements being associated with each of the characters, readout from memory, said logic means including a first plurality of logic stages each responsive, bit by bit, to one of the characters readout from memory for controlling the binary states of the $n$ storage elements associated with said character, and a second plurality of logic stages, each responsive, bit by bit, to the character in one of said shift registers for controlling the binary states of the corresponding elements in said $n$ groups with which said register is associated, whereby the binary state of each storage element in said plurality of groups of $n$ storage elements is controlled as a function of the comparison between the character from memory associated therewith and the character in the shift register with which the element is associated.

3. The system defined in claim 2 wherein each logic stage in said second plurality of logic stages includes bistable means for controlling the response of the logic stage of said second plurality of the output of its associated shift register to control the comparison criterion with which the character in the shift register is compared with each of the characters readout in parallel from said memory.

4. The system defined in claim 3 wherein said bistable means includes first and second flip flops each operable in either of two states, the combinations of the states of said first and second flip flops defining at least three comparison criteria including, equality, equal to or greater than, and equal to or smaller with which the character in a shift register is compared with each of the characters readout from memory.

5. The system defined in claim 4 further including a multibit query register each bit having first and second binary states, and means responsive to the states of the $n$ storage elements of each group, indicative of the comparisons between the character associated with said group and each of the characters in the $n$ registers, for comparing the states of the $n$ storage elements of each group with the states of a selected number of the bits of said query register.

6. In combination with a memory consisting of at least one data track in which multicharacter records are stored, each record including any combination of characters of a plurality of characters, including an end-of record character, the memory including means for sequentially reading out each character, bit by bit, an arrangement comprising:

$n$ registers for storing therein $n$ characters of the plurality of characters of said records, including said end-of-record character;

at least one first plurality of $n$ storage elements, a different element associated with a different one of said $n$ registers;

at least one second plurality of $n$ storage elements each element in said first plurality of elements having a corresponding element in said second plurality of elements;

means for inductively coupling each of the storage elements in said first plurality of elements with one of said registers and with said means for sequentially reading out, said means including logic means, responsive to the character readout from said track, bit by bit, and each of the $n$ characters in said registers for controlling the binary state of each storage element in the first plurality of storage elements, as a function of a preselected comparison criterion between the character readout from said memory and the character in the register associated with said storage element;

control means for controlling at the end of each character comparison interval the binary states of the second plurality of the $n$ elements as a function of their states and the states of the corresponding elements in said first plurality of elements;

a query register comprising of $n$ bits operable to represent a selected query criterion; and means coupled to said query register and said second plurality of storage elements including means for comparing the binary states of the bits of said query register with the binary states of said second plurality of $n$ elements to provide a first selected signal when the states of a selected group of said $n$ elements in said second plurality of elements compare with the states of a corresponding group of bits of the $n$ bits of said query register.

7. The arrangement defined in claim 6 wherein each of said characters comprises of a fixed number of bits, said control means including means coupled to said logic means for controlling the comparison of each character readout from memory with each of the characters in each of said $n$ registers, bit by bit, the state of each element in said first plurality at the end of the comparison of a complete character readout from memory during a character comparison interval, being indicative of the comparison between said readout character and the character in the register associated with the element, said end-of-record character being stored in one of said registers.

8. The arrangement defined in claim 7 wherein said means for comparing provide said first selected signal only when the elements in said first and second pluralities of elements associated with the register wherein the end-of-record character is stored are in a preselected state, indicative of the reading out of an end-of-record character from said memory, and the states of the selected group of said $n$ elements in said second plurality of elements correspond to the states of a corresponding group of bits of the $n$ bits of said query register.

9. In combination with a multitrack memory of the type wherein a plurality of records are stored in $x$ tracks of said memory, each record comprising of any number up to $n$ characters, each character including $y$ bits, the last character of each record consisting of an end-of-record character, and means for reading out in parallel, bit by bit, characters from said $x$ tracks, the characters comprising parts of $x$ different records, an arrangement for simultaneously comparing each of the $x$ readout characters with each of $n$ characters the arrangement comprising:

$n$ end-around-shift registers, a different register storing a different of the $n$ characters with which each of the characters readout from said memory is to be compared;

a first plurality of bistable elements arranged in an array of $x$ rows and $n$ columns, the elements in a different row being associated with a different track of said memory, and the elements in a different column being associated with a different register;

means coupling the elements in each row to the means for reading the characters from the track associated with the row of elements, including row logic means;

means coupling the elements in each column to the register associated therewith, including column logic means; and control means coupled to the row and logic means for supplying control pulses thereto to control the state of each element as a function of the comparison between the character supplied to the row logic means from the memory track associated therewith and the character in the register coupled thereto, whereby at the end of a character comparison interval, the states of the elements in each row correspond to the comparison between the character supplied to the row logic means associated with the row of elements and each of the characters in the $n$ shift registers.

10. The arrangement defined in claim 9 wherein said elements are controllable by said control means to be in a first state at the beginning of a character comparison interval, said control means providing said control pulses to said row logic means and to said column logic means so that, at the end of said character comparison interval each element at a row and column supplied with comparable characters remains in said first state and all other elements are in a second state.

11. The arrangement defined in claim 10 wherein each of said column logic means includes selectively settable means to control the comparison criterion between the character in the register associated with said column logic means and each of the characters readout from said memory.

12. The arrangement defined in claim 11 wherein said selectively settable means are set in any one of first, second, and third states defining comparison criteria of equality, equal to or greater than, and equal to or smaller than, respectively, whereby each of said $x$ characters readout in parallel from said memory is comparable with each of said $n$ characters in said $n$ registers in any one of at least three comparison criteria.

13. The arrangement defined in claim 12 wherein one of said registers stores the end-of-record indicating character, the arrangement including:

a query register comprising a plurality of bits each having two states for defining a search criterion;

a second plurality of bistable elements, each one associated with a corresponding element in said first plurality of bistable elements, said control means including means for combining at the end of each character comparison interval, the states of the elements of said first plurality of bistable elements with the states of corresponding element of the second plurality of bistable elements; and means for associatively comparing the states of the bits of said query register with the states of the elements in said second plurality of elements, associated with each row of elements in said first plurality of bistable elements, to provide a selected output signal when a positive comparison is produced and the bistable element in the row of elements in said first plurality of bistable elements associated with the register storing the end-of-record character is in said first state.

14. In combination with a memory system including a memory wherein multicharacter records are stored, each record including an end-of-record character at the end thereof, each character consisting of a fixed number of bits, and $x$ read out means for reading out in parallel $x$ records, character by character, and, bit by bit, an arrangement for providing an output signal in response to each record readout which contains a preselected combination of characters. defining a search criterion, the arrangement comprising:

$n$ end-around-register a different one storing a different character with which the record characters are to be compared;

$x$ memory words, each defining T and T′ fields, each field including $n$ elements having first and second stable states and switchable therebetween, corresponding elements of the T field being associated with a different shift register;

$x$ row logic stages a different one coupling a different readout means to a different memory word;

$n$ column logis stages, a different one coupled to a different register and the corresponding elements in the T fields associated therewith;

first control means associated with the $x$ row logic stages and the $n$ column logic stages, for controlling the operation of said logic stages during a plurality of each of bit comparison intervals defining a character comparison interval, whereby at the end of the character comparison interval, the state of each element in the T field is a function of the comparison between the character in the register associated therewith and the character supplied from the readout means coupled to the memory word thereof, said first control means providing at the end of each character comparison interval control signals to control the states of the $n$ elements of the T′ field of each word to be a function of their state and that of the corresponding elements of the T field;

a query register comprising of $n$ bistable elements their combined states defining a search criterion; and second control means for associatively comparing the states of at least some of the $n$ elements of said query register with the states of corresponding elements in each of said $x$T′ fields to provide an output signal associated with the T′ field when the states of the elements of the T′ field match the states of the selected elements of said query register.

15. The arrangement defined in claim 14 wherein each of said column logic means includes selectably settable means for controlling the comparison criterion with which the character in the register associated with the column logic means is compared with each of the characters readout from said memory, said selectably settable means being settable in any one of at least three states defining equality, equal to or greater than, and equal to or smaller than comparison criteria.

16. The arrangement defined in claim 14 wherein each of said memory word comprises a wire having the exterior surface thereof plated with magnetic material.

References Cited

UNITED STATES PATENTS

| | | | |
|---|---|---|---|
| 3,290,659 | 12/1966 | Fuller et al. | 340—172.5 |
| 3,293,619 | 12/1966 | Luhn | 340—172.5 |
| 3,302,186 | 1/1967 | Raser et al. | 340—172.5 |
| 3,332,069 | 7/1967 | Joseph et al. | 340—172.5 |
| 3,350,695 | 10/1967 | Kaufman et al. | 340—172.5 |
| 3,350,698 | 10/1967 | Pritchard | 340—172.5 |
| 3,374,486 | 3/1968 | Wanner | 340—172.5 |

PAUL J. HENON, *Primary Examiner.*

RAULFE B. ZACHE, *Assistant Examiner.*